Inventor:
John Tjaarda

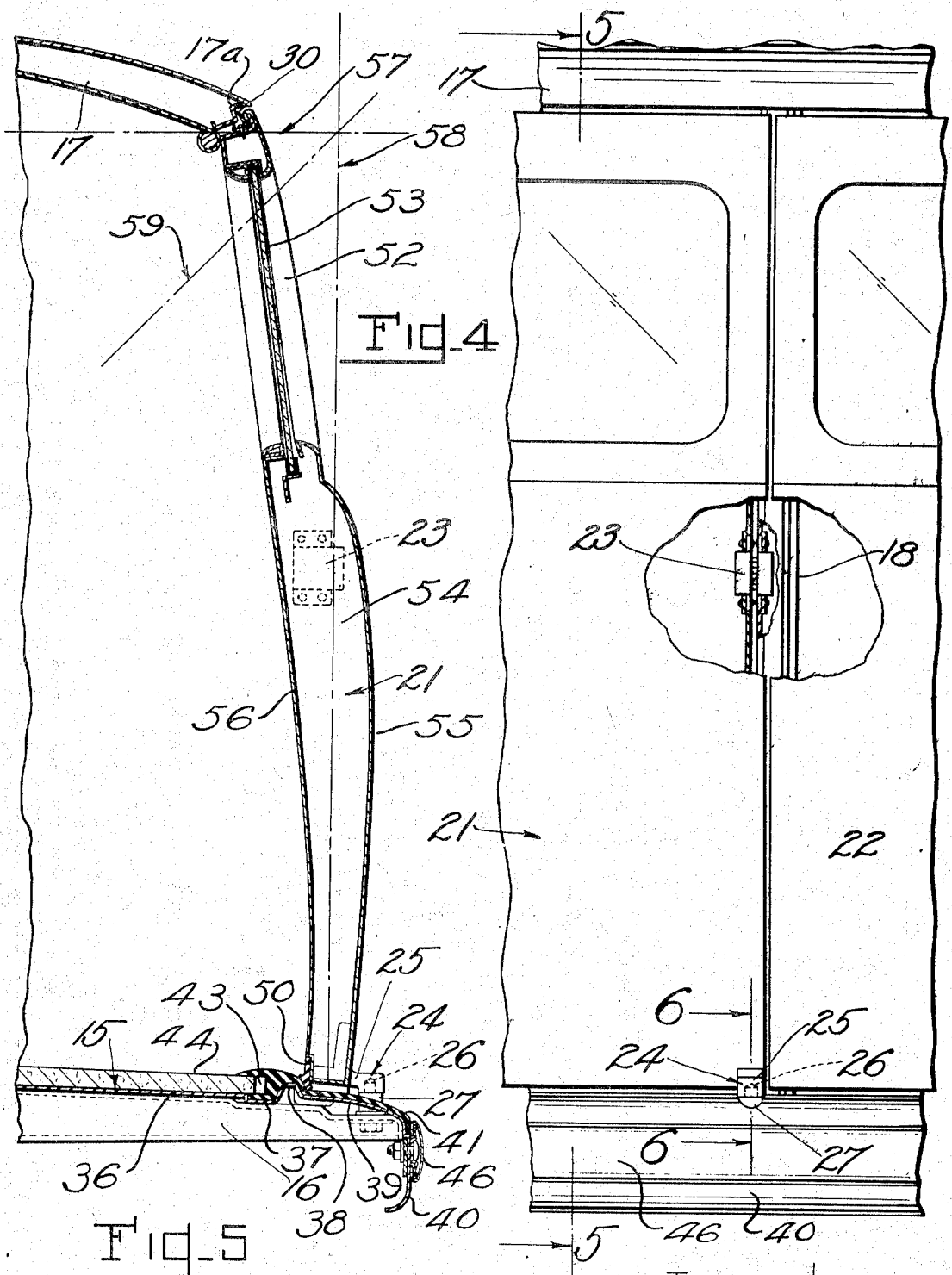

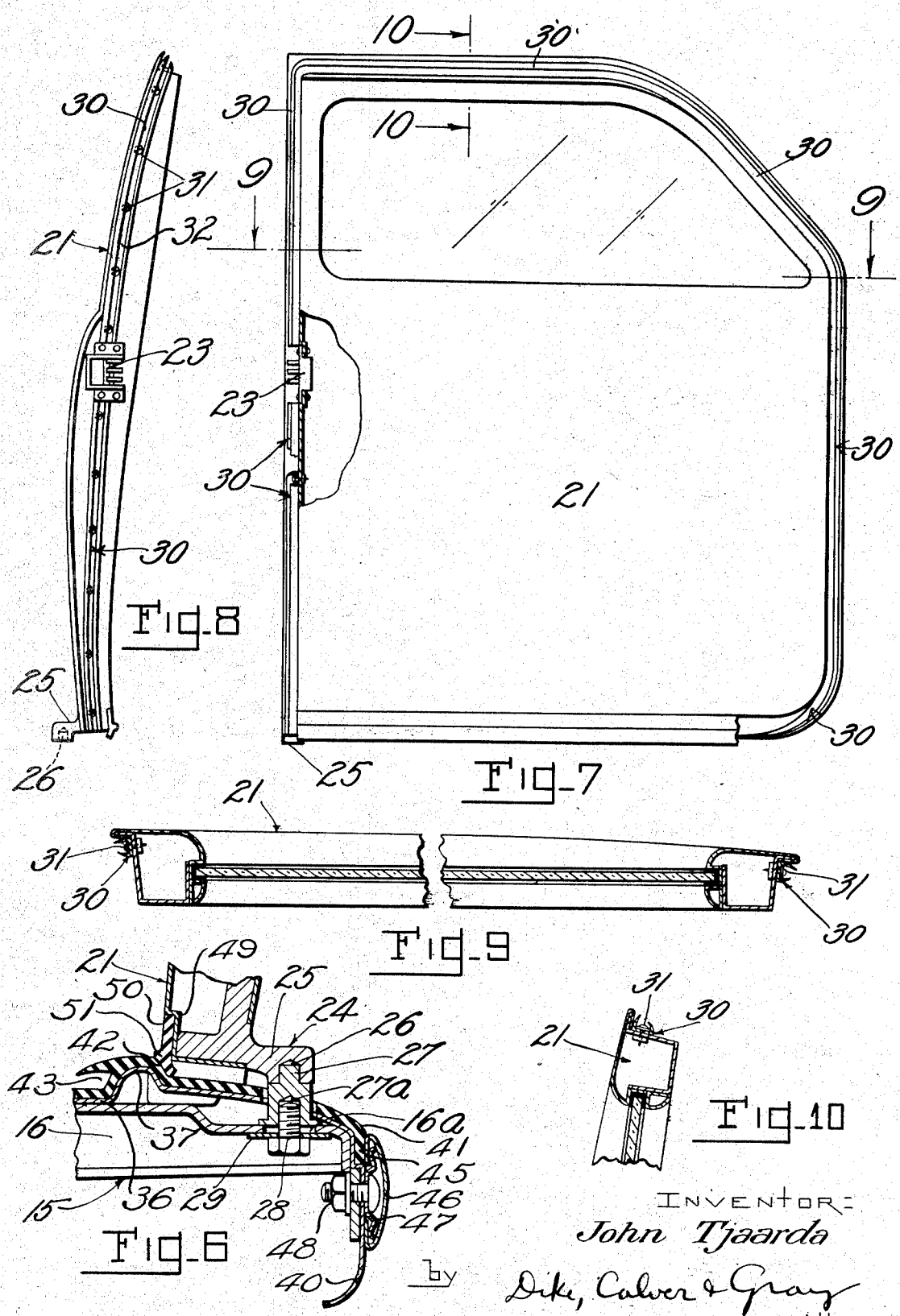

Patented May 3, 1938

2,116,330

UNITED STATES PATENT OFFICE 2,116,330

DOOR AND BODY CONSTRUCTION

John Tjaarda, Birmingham, Mich., assignor to Briggs Manufacturing Company, Detroit, Mich., a corporation of Michigan Application November 27, 1933, Serial No. 699,895

13 Claims. (Cl. 296—28)

This invention relates to vehicle bodies and more particularly to automobile bodies, an object of the invention being to improve the construction of the body while at the same time imparting thereto desirable streamline characteristics whereby wind resistance may be materially reduced during operation of the vehicle.

A further object of the invention is to provide an improved vehicle body construction wherein the door openings are extended into the roof in such manner as to increase the height thereof and provide maximum overhead clearance thereby facilitating entrance into and exit from the vehicle, the improved construction also being such as to provide side walls and a roof for the vehicle having substantially maximum streamlined effect.

A further object of the invention is to provide a door and body construction in which the body side pillar is relieved of the strain of carrying the door, and wherein the weight of the door is sustained by a frame cross member forming a part of the floor or under-frame structure.

Another object of the invention is to provide a vehicle body having a door which may be easily adjusted after installation so as to accommodate it to the door opening in the body.

Another object of the invention is to improve the appearance of the vehicle body and to provide a body having tight fitting doors and normally concealed means for sealing the door when closed and also for carrying off water which might otherwise find its way into the interior of the body, the construction also providing improved means for damping out objectionable metallic noises normally produced upon closing the car doors.

Other objects of this invention will appear in the following description and appended claims, reference being had to the accompanying drawings forming a part of this specification wherein like reference characters designate corresponding parts in the several views.

In said drawings:

Fig. 4 is an enlarged fragmentary view, similar to Fig. 1.

Fig. 5 is a vertical section taken substantially along the line 5—5 of Fig. 4.

Fig. 6 is a vertical section, on an enlarged scale, taken substantially along the line 6—6 of Fig. 4.

Fig. 7 is an elevation of the front door as viewed from the inside.

Fig. 8 is a rear end elevation of the door of Fig. 7.

Fig. 9 is a horizontal section taken substantially along the line 9—9 of Fig. 7; and Fig. 10 is a vertical section taken substantially along the line 10—10 of Fig. 7.

Figure 1:
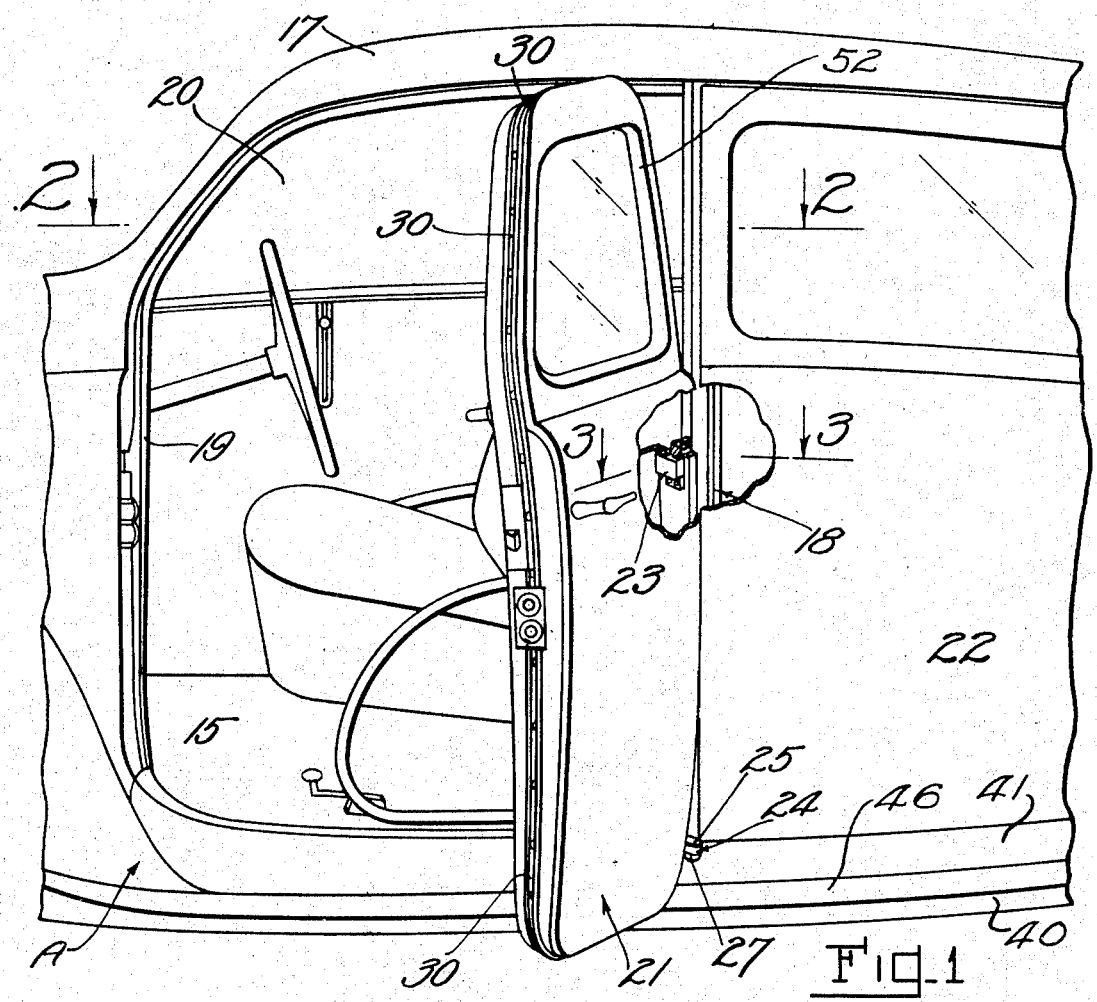
Fig. 1 is a fragmentary side elevation of an automobile body embodying the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawings, A represents a motor vehicle body of the closed type having a floor structure or unit 15 including cross frame members 16, a roof structure or unit 17, and door pillars or posts, the center pillar of which is shown at 18. The front end of the body is designed so as to provide a sloping windshield, one of the windshield pillars or posts being shown at 19 and the front door opening being indicated at 20. The vehicle front door 21 is attached to the center pillar 18 by a concealed hinge member 23 of suitable construction. The weight of the front door, however, is carried by the cross frame member 16 and the door is pivotally mounted upon said cross member by a pivot hinge member 24, shown in detail in Figs. 5 and 6. The car body is provided with rear doors, one of which is shown at 22. The rear door may be mounted in a manner similar to the front door by means of hinge members corresponding to the members 23 and 24. It will be understood that substantially the entire weight of the door 21 is carried by the hinge member 24 and that the concealed hinge member 23 serves merely as a retaining means for the door and to permit its swinging movement.

The pivot hinge 24 comprises a bracket member 25 carried by the door, which bracket has in its under face a socket 26 (see particularly Fig. 6) which is adapted to fit over the head of a vertical stud or pintle 27 carried by the cross frame member 16. This stud is provided with an internally threaded socket 27a which receives a bolt which, together with a washer 29, serves to hold the stud in place. It will be noted that the cross frame member 16 is provided with a slot 16a through which the bolt 28 passes to permit adjustment of the stud laterally and longitudinally with respect to the supporting cross frame member so that the car door can be adjusted to a nicety within its opening 20. Limited vertical adjustment of the door relative to the frame member 16 may be effected by inserting a washer or washers between the stud member 27 and the cross member 16.

Figure 2:
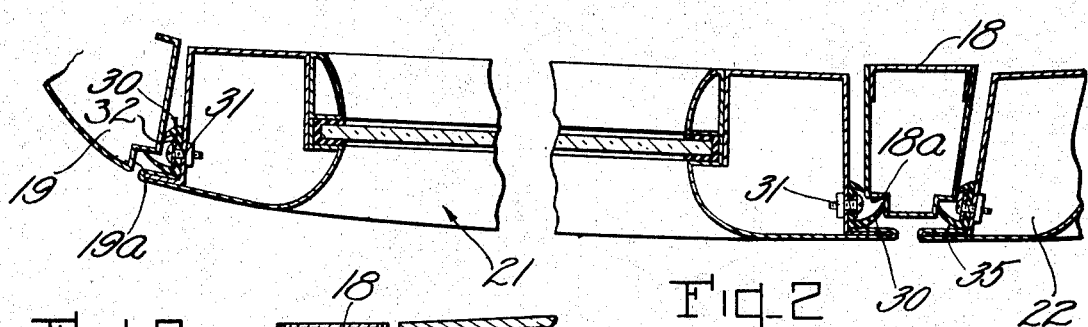
Fig. 2 is a horizontal section taken substantially along the line 2—2 of Fig. 1, with the door in closed position.
Figure 3:
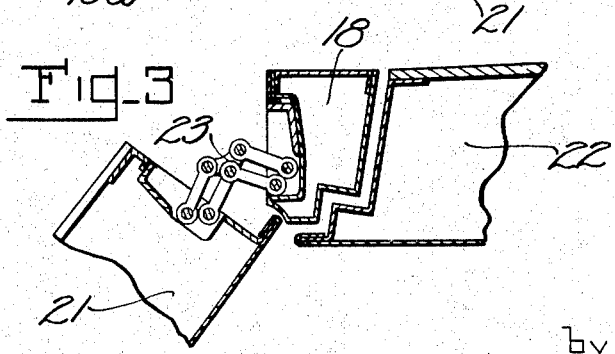
Fig. 3 is a horizontal section taken substantially along the line 3—3 of Fig. 1.

With previous closed motor vehicle bodies it has been customary to provide drain gutters or troughs located above the doors of the vehicle to carry off rain. In the present body and door construction, I have provided means for this purpose which forms a part of the door itself. In the present embodiment the front, rear and top edges or jamb faces of the door 21 are provided with a substantially channel-like rubber sealing strip 30 forming a drain or trough member. This strip has a base portion which is secured to the jamb face of the door in any suitable manner. The outer flange or wall of the trough member or gutter is relatively longer than the inner flange or wall thereof and is adapted to engage in the rabbet 19a (see Fig. 2) formed in the front body pillar 19 and the rabbeted edge 17a of the roof structure along the front edge and top of the door, respectively. The longer flange of the trough member carried by the rear edge of the door 21 engages in a similar rabbeted edge 18a formed in the center pillar 18. The shorter or smaller flange of the gutter engages the jamb faces of the framing members adjacent the door when closed, namely, the front pillar, top structure, and door pillar. From this construction it will be seen that the strip 30 with its spaced resilient walls provides a double seal around the marginal edges of the door opening, thus effecting substantially an airtight joint and at the same time preventing the ingress of water into the interior of the body. At the same time the strip 30 provides a gutter around the margin of the door so that any water that passes the outer flange member will flow downwardly in the trough member and pass out at the bottom on opposite side edges of the door. The rubber or other yieldable non-metallic member 30 serves not only as a wind break to prevent the entry of air into the body but also cushions the door and damps out objectionable metallic noises. Although only a portion of the rear door 22 is shown, it will be understood that a similar combined sealing and trough or gutter member 35 (see Fig. 2) is provided for this door, the flanges or walls of the member engaging in like manner the adjacent jamb portions of the body surrounding the rear door thereof.

The gutter or trough member is preferably attached along the side and top edges or jamb faces of the door by means of a metal retaining strip 32 installed within the channel or trough of the member and which is provided at spaced intervals with holes permitting the passage therethrough of bolts 31 for securing the sealing strip to the edges of the door.

Referring particularly to Figs. 5 and 6, the floor structure 15 in the present instance comprises a supporting plate 36 mounted on the cross frame member 16 and extending from side to side of the body, this plate being stamped from a metal sheet and being formed along the inner edges of the side walls with a groove or channel portion 37 and an upwardly projecting rib 38 providing a door stop along the inner edges of the threshold. The stamping 36 is also formed with an outwardly and downwardly inclined threshold portion 39 which also provides a running board. The sheet is also pressed to provide a downwardly extending apron 40 extending along each lower longitudinal side of the body. The threshold and running board 39 are preferably covered with a soft rubber sheet 41 which is molded to provide a channel portion embracing the rib 37 of the floor plate thereby providing an abutment 42 forming a door bumper along the inner edge of each door. The rubber sheet 41 is also formed with a channel 43 adapted to receive and confine the edge of a suitable mat or carpeting 44. It will be noted that the outer edge of the rubber sheet 41 is extended downwardly at 45 and this edge is confined and clamped in position by the overhanging upper edge of a sheet metal molding strip 46. This strip is secured along the face of the apron 40 by means of a spring retainer 47 which in turn is fastened in position by means of suitable bolts and nuts 48. In the present instance the lower edge of the door paneling is offset outwardly at 49 to provide a recess or groove within which is secured a rubber bumper strip 50, this strip having an enlarged tapered lower edge adapted to engage the abutment 42 when the door is closed. From this construction it will be seen that the lower edge of the door is effectually sealed when closed while at the same time the sealing means is so constructed as to dampen out and deaden metallic noises produced when the door is closed.

In accordance with one aspect of the present invention the vehicle body is constructed so as to have door openings of maximum height in order to afford the desirable overhead clearance for the passenger when entering and leaving the vehicle. In the patent to La Mar Bresee, No. 1,855,621, patented April 26, 1932, there is shown an improved vehicle body construction wherein the door openings are extended past the line of juncture of the side wall and roof so that an upper offset or deflected top portion of the door extends into the roof itself. It is a purpose of the present invention to utilize the advantages of the structure shown in the Bresee patent while at the same time providing improvements thereover whereby it is possible to utilize these advantages while providing a substantially full streamlined structure. Accordingly, referring particularly to Fig. 5, the roof 17 of the body is upwardly curved or domed to stream-line the same and the upper portion of the door is sloped inwardly and upwardly and deflected in such manner as to project into the roof. The upper portion of the door is formed into a window frame 52 within which is slidably mounted a glass panel 53. The window frame and the glass panel are inclined upwardly and inwardly, as seen in Fig. 5, and when the glass is lowered it travels on an inclined plane into the well 54 formed between the inner and outer panels 55 and 56 of the door. The inner panel 56 below the window sill is also inclined or sloped so as to conform approximately to the inclined plane of the glass panel 53, and the construction, therefore, is such that the glass may be fully lowered and at the same time received within the well 54.

In Fig. 5 the broken line 57 indicates the horizontal plane passing through the proposed longitudinal edges of the roof, and the broken line 58 indicates the vertical plane extending through the lower edge or base of the door. The line of juncture of the roof and side wall opening or door of a conventional closed body would be located substantially at the point represented by the broken line 59. From the foregoing, therefore, it will be seen that in accordance with the present invention, the door opening in the body extends on both sides of the line of juncture 59 of the side wall and roof. It will also be seen that the width of the roof between its longitudinal marginal edges is materially less than the distance between the lower edges of the doors of the body. As a consequence the upper end of each door is deflected so as to extend into the roof itself, but the construction is such as to provide a nearly full streamlined side wall and roof structure.

I claim:

1. An automobile body having a side wall, a floor structure, and a roof extending angularly from said wall, said wall having an opening therein and a stationary frame around said opening, and a horizontally swinging door complementary to said opening and provided with an inwardly inclined window frame having the major portion thereof at the inner side of a longitudinal vertical plane passing through the base of the door, said door being pivotally mounted upon said floor structure independently of said wall to swing on a vertical axis adjacent said plane.

2. An automobile body having a side wall and a roof extending angularly therefrom, a floor structure including a cross frame member, said wall having an opening therein and a stationary frame around said opening, and a horizontally swinging door complementary to said opening and provided with an inwardly inclined window frame having the upper portion thereof disposed at the inner side of a longitudinal vertical plane passing through the base of the door, said door being pivoted at its lower end to said cross frame member independently of said wall to swing on a vertical axis offset outwardly from said plane.

3. In a vehicle body, in combination, a floor structure, a roof structure for said body, a door pillar attached to said floor and roof structures, a door, means for hingedly connecting said door to said pillar, and separate means for pivotally mounting the lower end of said door upon said floor structure independently of said pillar, whereby the weight of said door is carried by said floor structure.

4. In a vehicle body, in combination, a floor structure having cross members, a roof structure for said body, a door pillar attached to the floor and roof structures, a door hingedly connected to said door pillar, and separate means for pivotally supporting said door upon one of said cross members independently of said pillar, whereby the weight of said door is sustained by said cross member.

5. In a vehicle body, in combination, a floor structure, a roof structure, a door pillar attached to said floor and roof structures, a swinging door, means for hingedly connecting said door with said pillar, and separate means carried by the bottom of said door and said floor structure for pivotally mounting the door upon said floor structure independently of said door pillar, whereby the weight of the door is carried by the floor structure.

6. In a vehicle body, in combination, a floor structure, a roof structure, a door pillar attached to said floor and roof structures, a swinging door, means for hingedly connecting said door with said pillar, and adjustable means carried by said floor structure for pivotally supporting the bottom of said door independently of said door pillar, whereby the weight of said door is carried by said floor structure.

7. In a vehicle body having a floor structure and a horizontally swinging door, said floor structure including a metal panel providing a threshold for the door and an outwardly extending running board, and a rubber covering for said threshold and running board provided with an abutment engageable with the lower edge of the door to form an air seal.

8. In a vehicle body having a floor structure and a horizontally swinging door, said floor structure including a stamped metal panel providing a threshold for the door and an outwardly extending running board terminating in a depending apron.

9. In a vehicle body having a floor structure and a horizontally swinging door, said floor structure including a stamped metal panel providing a threshold for the door and an outwardly extending running board terminating in a depending apron, and a rubber covering for said panel having a longitudinal abutment for the inner edge of the door.

10. In a vehicle body having a floor structure and a horizontally swinging door, said floor structure including a stamped metal panel providing a threshold for the door and an apron, a soft rubber covering for said threshold having a door engaging abutment, and a longitudinal molding strip on said apron for confining the outer edge of said covering.

11. In a vehicle body having a floor structure and a horizontally swinging door, said floor structure including a metal panel providing a threshold for the door and an outwardly extending running board, a rubber covering for said threshold and running board provided with an abutment, and a rubber bumper strip carried by said door and engageable with said abutment to form an air seal at the bottom of the door.

12. An automobile body having a base frame, a side wall and a roof extending angularly from said wall, said wall having a side opening therein and a stationary frame around said opening, a swinging door complementary to said opening and having the upper portion inclined inwardly of the longitudinal vertical plane passing through the base of the door, the upper edge of the door and said frame being unconnected and the lower edge of said door being pivotally supported on said base frame.

13. In a vehicle body, in combination, a floor structure, a roof structure for the body, a cross frame member upon which said floor structure is mounted, a door pillar attached to the floor and roof structures, a door attached to said pillar, and means for mounting said door upon said cross frame member for swinging movement, whereby the weight of said door is sustained by said cross frame member.

JOHN TJAARDA.